United States Patent [19]

Zannucci

[11] 4,269,629
[45] May 26, 1981

[54] STABILIZED CELLULOSE ESTER COMPOSITIONS

[75] Inventor: Joseph S. Zannucci, Kingsport, Tenn.

[73] Assignee: Eastman Kodak Company, Rochester, N.Y.

[21] Appl. No.: 77,875

[22] Filed: Sep. 21, 1979

Related U.S. Application Data

[63] Continuation of Ser. No. 902,607, May 3, 1978, abandoned.

[51] Int. Cl.³ .............................................. C08L 1/10
[52] U.S. Cl. .................................. 106/176; 106/178; 106/186; 106/189
[58] Field of Search ................ 106/176, 178, 186, 189

[56] References Cited

U.S. PATENT DOCUMENTS

| | | | |
|---|---|---|---|
| 3,031,321 | 4/1962 | Harris et al. | 106/176 |
| 3,637,582 | 1/1972 | Gilles | 260/45.8 NT |
| 3,766,205 | 10/1973 | Heller et al. | 260/45.8 NT |

Primary Examiner—Lorenzo B. Hayes
Attorney, Agent, or Firm—Clyde L. Tootle; Daniel B. Reece, III

[57] ABSTRACT

This invention is directed to a three component stabilizer system for cellulose esters. These commercially useful stabilized cellulose ester compositions can be molded, shaped and otherwise processed in a thermoplastic condition at elevated temperatures to provide products having improved ultraviolet light stability or weatherability.

13 Claims, No Drawings

STABILIZED CELLULOSE ESTER COMPOSITIONS

This is a continuation of application Ser. No. 902,607 filed May 3, 1978, now abandoned.

This invention is directed to a three component stabilizer system for cellulose esters and their commercially useful stabilized compositions which provide finished products having improved weatherability.

Cellulose esters have been used extensively to prepare various molded, shaped, formed or extruded articles. These various articles when exposed to sunlight over an extended period of time tend to degrade and the physical properties of the molded articles are lowered to the point where the articles are no longer useful. Various materials have been suggested for stabilizing cellulose esters against the degradative effects of exposure to sunlight. These suggested stabilizers in general have been effective in improving the weatherability of cellulose esters to some extent, but a more effective stabilizer system is desired which provides for improved stabilization over longer periods of time. It would therefore be an advance in the art to provide a stabilizing system which improves the weatherability of cellulose ester compositions.

An object of this invention is to prepare cellulose esters and their compositions which have improved weatherability. Another object of this invention is to provide a three component stabilizer system for cellulose ester plastic compositions.

In accordance with the present invention, a stabilizing system is provided for cellulose esters which comprises: (A) at least one compound having the formula

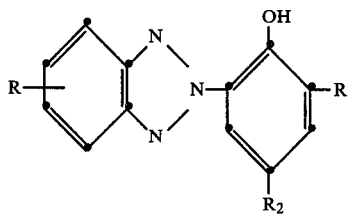

wherein R is selected from the group consisting of a halogen, hydrogen, a hydroxy group, an alkyl radical or an aryl radical, and $R_1$ and $R_2$ are selected from the group consisting of hydrogen or a branched or unbranched alkyl radical containing 1 to 12 carbon atoms, an aryl radical and hydrogen; (B) at least one compound having the formula:

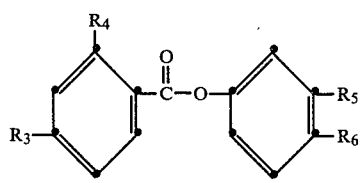

wherein $R_3$ and $R_6$ are hydrogen, alkoxy group containing 1 to 12 carbon atoms, or branched or unbranched alkyl group containing 1 to 12 carbon atoms; and at least one $R_5$ and $R_4$ is hydroxyl and the other is hydrogen; and (C) at least one conventional hindered phenolic antioxidant.

The stabilizing combination which we have found particularly useful for stabilizing cellulose esters plasticized with aliphatic dibasic esters and/or trialkyl phosphate is the combination of (1) about 0.1 to 0.5 percent by weight of 2-(3-t-butyl-2-hydroxy-5-methylphenyl)-5-chlorobenzotriazole, (2) about 1 to 4 percent by weight of resorcinol monobenzoate and (3) about 0.01 to 0.5 percent by weight tris(3,5-di-t-butyl-4-hydroxybenzyl)isocyanurate.

Any other conventional hindered phenolic antioxidants can be used in place of the tris(3,5-di-t-butyl-4-hydroxybenzyl)isocyanurate which provides similar results. Such conventional antioxidants are well known in the art and include phenolic antioxidants which contain one or more phenolic nuclei such as tetrakis[methylene(3,5-di-tert-butyl-4-hydroxyhydrocinnamate)methane], 2,6-di-tertiary-butyl-4-methylphenol, nonylphenol, phenylphenol and 2,4,6-tris(3,5-di-tert-butyl-4-hydroxybenzyl)mesitylene and the like.

Also, any conventional phenylbenzoates similar in structure to resorcinol monobenzoate or its photorearranged product (2,4-dihydroxybenzophenone) or derivatives thereof, such as 4-alkoxy-2-hydroxybenzophenone can be used in place of resorcinol monobenzoate. Such compounds are for example 2,4-dialkylphenyl 3,5-di-4-hydroxybenzoates such as 2,4-di-tert-butylphenyl 3,5-di-tert-butyl-4-hydroxybenzoate.

Also, any conventional hydroxyphenyl benzotriazole can be used in place of the 2-(3-t-butyl-2-hydroxy-5-methylphenyl)-5-chlorobenzotriazole, such as, for example, 2-(2'-hydroxy-5'-methylphenyl)benzotriazole, 2-(2-hydroxy-3,5-di-tert-pentylphenyl)benzotriazole, 2-(2-hydroxy-3,5-di-tert-butylphenyl)-5-chlorobenzotriazole and the like.

Conventional cellulose ester stabilizers may also be incorporated in the cellulose ester compositions of this invention. For example, the known potassium acid oxalate and acid citrate stabilizers may be employed without adverse effects. Also, the stabilized cellulose ester compositions can contain conventional plasticizers, pigments, colorants, and the like.

The cellulose esters which are stabilized in accordance with this invention are commercial organic cellulose esters of aliphatic acids, such as cellulose acetate, cellulose propionate, cellulose butyrate, cellulose acetate propionate, cellulose acetate butyrate, and the like.

The following examples illustrate the use of the stabilizer system in accordance with this invention.

EXAMPLE 1

One hundred parts of cellulose acetate butyrate (381-20) having a butyryl content of about 37 weight percent, an acetyl content of about 13 weight percent, a hydroxy content of about 2 weight percent and a viscosity of 20 sec. as determined by ASTM method D1343 was thoroughly mixed with dibutyl azelate (plasticizer) and the amounts of stabilizers listed below. Compression flexure bars were made from these mixtures and the flatwise impact strength of the cellulose acetate butyrate bars was determined on bars exposed to outdoor weathering in Miami, Fla. after exposure to twelve and twenty-four months.

TABLE 1

Flatwise Impact Strength of CAB Flexure Bars Plasticized With Dibutyl Azelate[1] and Stabilized with Eastman ® Inhibitor RMB, Tinuvin ® 326 and Good-rite ® 3114

| No. | Composition (%) | Flatwise Impact Strength[2] Months Exposed[3] | | |
|---|---|---|---|---|
| | | 0 | 12 | 24 |
| 1 | Control | 14 | 1 | — |
| 2 | RMB[4](2) | 22 | 4 | 3 |
| 3 | 326[5](1) | 20 | 4 | 3 |
| 4 | RMB(2) + 326(0.2) | 21 | 5 | 3 |
| 5 | RMB(2) + 3114[6](0.1) | 21 | 4 | 3 |
| 6 | RMB(2) + 3114(0.1) + 326(0.2) | 17 | 5 | 5 |

[1] Concentration of dibutylazelate is 8%
[2] ASTM Procedure D256-56
[3] Exposed in Miami, Florida by South Florida Test Service.
[4] RMB = Eastman ® Inhibitor RMB (resorcinol monobenzoate)
[5] 326 = Tinuvin ® 326 [2-(3-t-butyl-2-hydroxy-5-methylphenyl)-5-chlorobenzotriazole]
[6] 3114 = Good-rite ® 3114 [tris(3,5-di-t-butyl-4-hydroxybenzyl)-isocyanurate]

EXAMPLE 2

Cellulose acetate butyrate (381-20) plastic compositions were prepared and tested in a manner similar to that described in Example 1 except that trioctyl phosphate was used as the plasticizer. The test results were as follows:

TABLE 2

Flatwise Impact Strength of CAB Flexure Bars Plasticized with Trioctyl Phosphate and Stabilized with Eastman ® Inhibitor RMB, Tinuvin ® 326 and Good-rite ® 3114

| No. | Composition (%) | Flatwise Impact Strength[2] Months Exposed[3] | | |
|---|---|---|---|---|
| | | 0 | 18 | 24 |
| 1 | RMB[4](2) | 14 | 3 | 4 |
| 2 | RMB(2) + 326[5](0.2) | 21 | 4 | 4 |
| 3 | RMB(2) + 3114[6](0.1) | 22 | 4 | 3 |
| 4 | RMB(2) + 326(0.2) + 3114(0.1) | 19 | 7 | 7 |

[1] Concentration of trioctyl phosphate is 8%
[2] ASTM Procedure D256-56
[3] Exposed in Miami, Florida by South Florida Test Service
[4] RMB = Eastman ® RMB
[5] 326 = Tinuvin ® 326
[6] 3114 = Good-rite ® 3114

EXAMPLE 3

Cellulose acetate butyrate (381-20) plastic compositions were prepared in a manner similar to that described in Example 1, except that Texanol ® isobutyrate was used as the plasticizer in place of the trioctyl phosphate. The test results were as follows:

TABLE 3

Flatwise Impact Strength of CAB Flexure Bars Plasticized with Kodaflex ® TXIB[1] and Stabilized with Eastman ® Inhibitor RMB, Tinuvin ® 326 and Good-rite ® 3114

| No. | Composition (%) | Flatwise Impact Strength[2] Months Exposed[3] | | | |
|---|---|---|---|---|---|
| | | 0 | 12 | 18 | 24 |
| 1 | RMB[4](2) | 21 | 6 | 4 | 4 |
| 2 | RMB(2) + 326[5](0.2) | 17 | 9 | 3 | 3 |
| 3 | RMB(2) + 3114[6](0.1) | 21 | 6 | 3 | 3 |
| 4 | RMB(2) + 3114(0.1) + 326(0.2) | 14 | 20 | 7 | 7 |

[1] Concentration of Kodaflex ® TXIB is 8%.
[2] ASTM Procedure D256-56.
[3] Exposed in Miami, Florida by South Florida Test Service.
[4] RMB = Eastman ® Inhibitor RMB.
[5] 326 = Tinuvin ® 326.
[6] 3114 = Good-rite ® 3114.

The invention has been described in detail with particular reference to certain preferred embodiments thereof, but it will be understood that variations and modifications can be effected within the spirit and scope of the invention.

We claim:

1. A cellulose ester plastic composition containing a stabilizing amount of the combination of
   (A) at least one hydroxybenzotriazole compound having the formula

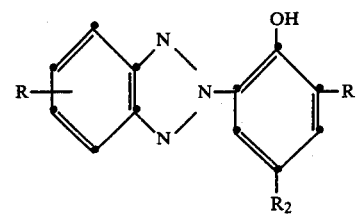

wherein R is selected from the group consisting of a halogen, hydrogen, a hydroxy group, an alkyl radical or an acyl radical, and $R_1$ and $R_2$ are selected from the group consisting of hydrogen or a branched or unbranched alkyl radical containing 1 to 12 carbon atoms, an acyl radical and hydrogen;
   (B) at least one phenylbenzoate having the formula:

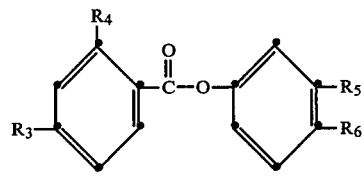

wherein $R_3$ and $R_6$ are hydrogen, alkoxy group containing 1 to 12 carbon atoms, or branched or unbranched alkyl group containing 1 to 12 carbon atoms; and at least one of $R_5$ and $R_4$ is hydroxyl and the other is hydrogen; and
   (C) at least one conventional hindered phenolic antioxidant.

2. A cellulose ester plastic composition according to claim 1 wherein said conventional hindered phenolic antioxidant is tris(3,5-di-t-butyl-4-hydroxybenzyl)isocyanurate.

3. A cellulose ester plastic composition according to claim 2 wherein said phenylbenzoate is resorcinol monobenzoate.

4. A cellulose ester plastic composition according to claim 3 wherein said hydroxyphenyl benzotriazole is 2-(3-t-butyl-2-hydroxy-5-methylphenyl)-5-chlorobenzotriazole.

5. A cellulose ester plastic composition containing a stabilizing amount of the combination of
(A) about 0.1 to 0.5 percent by weight of at least one hydroxybenzotriazole compound having the formula

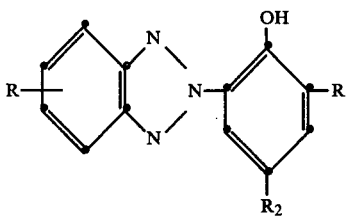

wherein R is selected from the group consisting of a halogen, hydrogen, a hydroxy group, an alkyl radical or an acyl radical, and $R_1$ and $R_2$ are selected from the group consisting of hydrogen or a branched or unbranched alkyl radical containing 1 to 12 carbon atoms, an acyl radical and hydrogen;
(B) about 1 to 4 percent by weight of at least one phenylbenzoate having the formula:

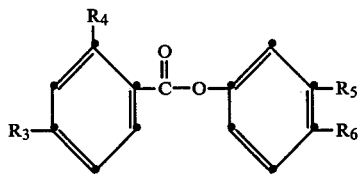

wherein $R_3$ and $R_6$ are hydrogen, alkoxy group containing 1 to 12 carbon atoms, or branched or unbranched alkyl group containing 1 to 12 carbon atoms; and at least one of $R_5$ and $R_4$ is hydroxyl and the other is hydrogen; and
(C) about 0.01 to 0.5 percent by weight of at least one conventional hindered phenolic antioxidant.

6. A cellulose ester plastic composition according to claim 5 wherein said conventional hindered phenolic antioxidant is tris(3,5-di-t-butyl-4-hydroxybenzyl)isocyanurate.

7. A cellulose ester plastic composition according to claim 6 wherein said phenylbenzoate is resorcinol monobenzoate.

8. A cellulose ester plastic composition according to claim 7 wherein said hydroxyphenyl benzotriazole is 2-(3-t-butyl-2-hydroxy-5-methylphenyl)-5-chlorobenzotriazole.

9. A cellulose ester plastic composition according to claim 8 containing a stabilizing amount of the combination of
(A) about 0.1 to 0.5 percent by weight of tris(3,5-di-t-butyl-4-hydroxybenzyl)isocyanurate,
(B) about 1 to 4 percent by weight of resorcinol monobenzoate, and
(C) about 0.01 to 0.5 percent by weight of 2-(3-t-butyl-2-hydroxy-5-methylphenyl)-5-chlorobenzotriazole.

10. A cellulose ester plastic composition according to claim 8 containing a stabilizing amount of the combination of
(A) about 0.1 to 0.5 percent by weight of tetrakis[methylene(3,5-di-tert-butyl-4-hydroxyhydrocinnamate)methane],
(B) about 1 to 4 percent by weight of resorcinol monobenzoate, and
(C) about 0.01 to 0.5 percent by weight of 2-(3-t-butyl-2-hydroxy-5-methylphenyl)-5-chlorobenzotriazole.

11. A cellulose ester plastic composition according to claim 8 containing a stabilizing amount of the combination of
(A) about 0.1 to 0.5 percent by weight of tris(3,5-di-t-butyl-4-hydroxybenzyl)isocyanurate,
(B) about 1 to 4 percent by weight of phenylsalicylate, and
(C) about 0.01 to 0.5 percent by weight of 2-(3-t-butyl-2-hydroxy-5-methylphenyl)-5-chlorobenzotriazole.

12. A cellulose ester plastic composition containing a stabilizing amount of the combination of
(A) about 0.1 to 0.5 percent by weight of tris(3,5-di-t-butyl-4-hydroxybenzyl)isocyanurate,
(B) about 1 to 4 percent by weight of resorcinol monobenzoate, and
(C) about 0.01 to 0.5 percent by weight of 2-(2-hydroxy-3,5-di-tert-butylphenyl)-5-chlorobenzotriazole.

13. A cellulose ester plastic composition containing a stabilizing amount of the combination of
(A) about 0.1 to 0.5 percent by weight of tetrakis[methylene(3,5-di-tert-butyl-4-hydroxyhydrocinnamate)methane],
(B) about 1 to 4 percent by weight of resorcinol monobenzoate, and
(C) about 0.01 to 0.5 percent by weight of 2-(2-hydroxy-3,5-di-tert-butylphenyl)-5-chlorobenzotriazole.

* * * * *